United States Patent
Lin et al.

(10) Patent No.: US 12,464,173 B2
(45) Date of Patent: Nov. 4, 2025

(54) VIRTUAL GIFT DISPLAY

(71) Applicant: SHANGHAI BILIBILI TECHNOLOGY CO., LTD., Shanghai (CN)

(72) Inventors: Xian Lin, Shanghai (CN); Yong Zhou, Shanghai (CN); Fan Zhang, Shanghai (CN)

(73) Assignee: SHANGHAI BILIBILI TECHNOLOGY CO., LTD., Shanghai (CN)

( * ) Notice: Subject to any disclaimer, the term of this patent is extended or adjusted under 35 U.S.C. 154(b) by 144 days.

(21) Appl. No.: 18/421,907

(22) Filed: Jan. 24, 2024

(65) Prior Publication Data
US 2024/0179355 A1    May 30, 2024

Related U.S. Application Data

(63) Continuation of application No. PCT/CN2022/099271, filed on Jun. 16, 2022.

(30) Foreign Application Priority Data

Aug. 17, 2021    (CN) .......................... 202110945185.3

(51) Int. Cl.
*H04N 21/2187*    (2011.01)
*G06V 10/10*    (2022.01)
(Continued)

(52) U.S. Cl.
CPC ......... *H04N 21/2187* (2013.01); *G06V 10/16* (2022.01); *H04N 21/4316* (2013.01); *H04N 21/4788* (2013.01)

(58) Field of Classification Search
CPC ............... G06V 10/16; H04N 21/2187; H04N 21/4316; H04N 21/4788
See application file for complete search history.

(56) References Cited

U.S. PATENT DOCUMENTS

| | | | |
|---|---|---|---|
| 2014/0337168 | A1 | 11/2014 | Laorauvirodge |
| 2019/0355050 | A1 | 11/2019 | Geisler et al. |

(Continued)

FOREIGN PATENT DOCUMENTS

| | | |
|---|---|---|
| CN | 105335051 A | 2/2016 |
| CN | 105872442 A | 8/2016 |

(Continued)

OTHER PUBLICATIONS

Notice of Allowance of the counterpart CN Application No. 202110945185.3, dated Mar. 13, 2024, 4 pages.

(Continued)

*Primary Examiner* — Ngoc K Vu
(74) *Attorney, Agent, or Firm* — FisherBroyles, LLP (57) ABSTRACT

This application provides a virtual gift display method. The method includes: receiving virtual gift information, where the virtual gift information includes a given target virtual gift and a giving quantity of target virtual gifts; obtaining at least two gift pictures corresponding to the target virtual gift from a gift picture material library; splicing the at least two obtained gift pictures based on the giving quantity of target virtual gifts and a preset splicing rule, to obtain a bullet-screen comment picture; and displaying the bullet-screen comment picture in a bullet-screen comment area. In this way, a virtual gift given by a user can be displayed by using a bullet-screen comment function built in a live room, without a need to redevelop a virtual gift display function, to greatly reduce development costs and development time. In addition, a bullet-screen comment and a gift giving function may be combined, to improve user experience.

20 Claims, 5 Drawing Sheets

Receive virtual gift information, where the virtual gift information includes a given target virtual gift and a giving quantity of target virtual gifts — 202

Obtain at least two gift pictures corresponding to the target virtual gift from a gift picture material library — 204

Splice the at least two obtained gift pictures based on the giving quantity of target virtual gifts and a preset splicing rule, to obtain a bullet-screen comment picture — 206

Display the bullet-screen comment picture in a bullet-screen comment area — 208

(51) Int. Cl.
  *H04N 21/431* (2011.01)
  *H04N 21/4788* (2011.01)

(56) References Cited

U.S. PATENT DOCUMENTS

2020/0374590 A1  11/2020  Lu
2021/0127171 A1   4/2021  Liu et al.

FOREIGN PATENT DOCUMENTS

| CN | 106534875 | A |   | 3/2017 | | |
|---|---|---|---|---|---|---|
| CN | 107169872 | A |   | 9/2017 | | |
| CN | 107241636 | A |   | 10/2017 | | |
| CN | 304839167 | S |   | 10/2018 | | |
| CN | 110351592 | A |   | 10/2019 | | |
| CN | 110418155 | A | * | 11/2019 | ......... | H04N 21/8352 |
| CN | 110493630 | A |   | 11/2019 | | |
| CN | 111131850 | A |   | 5/2020 | | |
| CN | 112087655 | A | * | 12/2020 | ........... | H04N 21/435 |
| CN | 112565824 | A |   | 3/2021 | | |
| CN | 113010710 | A |   | 6/2021 | | |
| CN | 110418207 | B | * | 8/2021 | ......... | H04N 21/2543 |

OTHER PUBLICATIONS

Li Hui, "Design and Implementation of Live Streaming System Using Micro Service Architecture Based On Open Cloud Platform", South China University of Technology Guangzhou, China, dated Nov. 30, 2019, 70 pages.
Search Report from the counterpart PCT Application PCT/CN2022/099271, mailing date: Aug. 18, 2022, 5 pages.
Lao Wang's guide to cultivation, "Product design and thinking about gift during the live stream," https://zhuanlan.zhihu.com/p/140909058, Website Publication date: May 14, 2020.

* cited by examiner

VIRTUAL GIFT DISPLAY

CROSS-REFERENCE TO RELATED APPLICATION

The present application is a continuation under 35 U.S.C. 111(a) of PCT International Application No. PCT/CN2022/099271, filed on Jun. 16, 2022, which claims priority to Chinese Patent Application No. 202110945185.3, filed on Aug. 17, 2021, the entire contents of which are hereby incorporated by reference in its entirety for all purposes.

TECHNICAL FIELD

This application relates to the field of computer technologies, and in particular, to a virtual gift display method. This application also relates to a computing device, and a non-transitory computer-readable storage medium.

BACKGROUND

With rapid development of computer technologies and Internet technologies, various types of livestreaming are emerging continuously. In a livestreaming process, users may interact with each other, and a user and an online streamer may interact with each other. For example, in process in which a user watches livestreaming, the user may be attracted by livestreaming content or excellent content of the online streamer, and give a virtual gift to the online streamer in a live room.

SUMMARY

According to a first aspect of the embodiments of this application, a method is provided, including:
  receiving virtual gift information, where the virtual gift information includes a given target virtual gift and a giving quantity of target virtual gifts;
  obtaining at least two gift pictures corresponding to the target virtual gift from a gift picture material library;
  splicing the at least two obtained gift pictures based on the giving quantity of target virtual gifts and a preset splicing rule, to obtain a bullet-screen comment picture; and
  displaying the bullet-screen comment picture in a bullet-screen comment area.

According to a second aspect of the embodiments of this application, a computing device is provided, including:
  one or more processors; and
  a memory, storing one or more programs configured to be executed by the one or more processors, the one or more programs comprising instructions for:
  receiving virtual gift information, where the virtual gift information includes a given target virtual gift and a giving quantity of target virtual gifts;
  obtaining at least two gift pictures corresponding to the target virtual gift from a gift picture material library;
  splicing the at least two obtained gift pictures based on the giving quantity of target virtual gifts and a preset splicing rule, to obtain a bullet-screen comment picture; and
  displaying the bullet-screen comment picture in a bullet-screen comment area.

According to a third aspect of the embodiments of this application, a non-transitory computer-readable storage medium is provided. The non-transitory computer-readable storage medium stores one or more programs comprising instructions that, when executed by one or more processors of a computing device, cause the computing device to perform operations comprising:
  receiving virtual gift information, wherein the virtual gift information comprises a given target virtual gift and a giving quantity of target virtual gifts;
  obtaining at least two gift pictures corresponding to the target virtual gift from a gift picture material library;
  splicing the at least two obtained gift pictures based on the giving quantity of target virtual gifts and a preset splicing rule, to obtain a bullet-screen comment picture; and
  displaying the bullet-screen comment picture in a bullet-screen comment area.

DETAILED DESCRIPTION OF EMBODIMENTS

Many specific details are described in the following descriptions, to facilitate full understanding of this application. However, this application can be implemented in many other manners different from those described herein. A person skilled in the art can make similar promotion without departing from the connotation of this application. Therefore, this application is not limited to specific implementations disclosed below.

Terms used in one or more embodiments of this application are merely used to describe specific embodiments, and are not intended to limit the one or more embodiments of this application. The terms "a" and "the" that are in singular forms and that are used in one or more embodiments and the appended claims of this application are also intended to include plural forms, unless otherwise specified in the context clearly. It should be further understood that the term "and/or" used in one or more embodiments of this application indicates and includes any or all possible combinations of one or more associated listed items.

It should be understood that although the terms such as "first" and "second" may be used in one or more embodiments of this application to describe various types of information, the information should not be limited to these terms. These terms are only used to distinguish between information of a same type. For example, without departing from the scope of the one or more embodiments of this application, "first" may also be referred to as "second", and similarly, "second" may also be referred to as "first". Depending on the context, for example, the word "if" used herein can be interpreted as "while", "when", or "in response to determining".

Terms used in the one or more embodiments of this application are explained first.

Bullet-screen comment: The bullet-screen comment is usually information that appears along a livestreaming time axis and that is sent by a user for livestreaming content when the user watches livestreaming, and may be usually a text, audio, or a picture.

Figure 1:
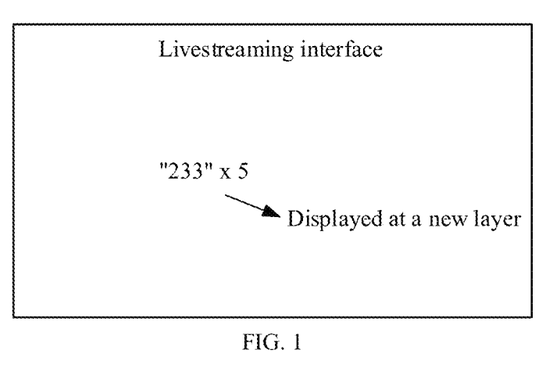
FIG. 1 is a schematic diagram of displaying a virtual gift in an existing manner according to some embodiments of this application.

It should be noted that, currently, when information about a virtual gift given by the user is displayed, a new layer usually pops up, to display a gift identifier of the virtual gift given by the user and a giving quantity. For example, FIG. 1 is a schematic diagram of displaying a virtual gift in an existing manner according to some embodiments of this application. As shown in FIG. 1, it is assumed that the user gives five gifts "233". In this case, a new layer pops up in a livestreaming interface, to display "233"×5 at the new layer. The new layer is neither a video layer nor a bullet-screen comment layer, but is another layer that displays information about the given virtual gifts.

The inventor of the present application finds that when a user wants to give a virtual gift to an online streamer, the user may select a virtual gift from a gift backpack, and give the selected virtual gift to the online streamer. In this case, a new layer pops up in a livestreaming interface, to display information about the virtual gift given by the user, for example, a gift name and a quantity.

However, in the foregoing virtual gift display process, a virtual gift display function needs to be specially developed, to make the new layer pop up in the livestreaming interface, display the information about the virtual gift given by the user, improve development costs, and waste development time.

In the virtual gift display method provided in this application, the virtual gift information may be received. The virtual gift information includes the given target virtual gift and the giving quantity of target virtual gifts. The at least two gift pictures corresponding to the target virtual gift are obtained from the gift picture material library. The at least two obtained gift pictures are spliced based on the giving quantity of target virtual gifts and the preset splicing rule, to obtain the bullet-screen comment picture. The bullet-screen comment picture is displayed in the bullet-screen comment area. In this case, at least two gift pictures corresponding to a target virtual gift given by a user may be obtained from a preset gift picture material library, the at least two obtained gift pictures are spliced based on a quantity of given target virtual gifts, to obtain a bullet-screen comment picture of the target virtual gift given by the user, and the bullet-screen comment picture is displayed in the bullet-screen comment area. In this way, a virtual gift given by the user can be displayed by using a bullet-screen comment function built in livestreaming, without a need to redevelop a virtual gift display function, to greatly reduce development costs and development time. In addition, a bullet-screen comment and a gift giving function may be combined, to improve user experience. In addition, at least two to-be-displayed gift pictures and a splicing rule may be predefined for the virtual gift. In other words, different virtual gifts may be displayed in different forms, to greatly improve virtual gift display flexibility, and improve user experience.

This application provides a virtual gift display method. This application also relates to a virtual gift display apparatus, a computing device, a computer-readable storage medium, and a computer program product. The virtual gift display method, the virtual gift display apparatus, the computing device, the computer-readable storage medium, and the computer program product are described in detail one by one in the following embodiments.

Figure 2:
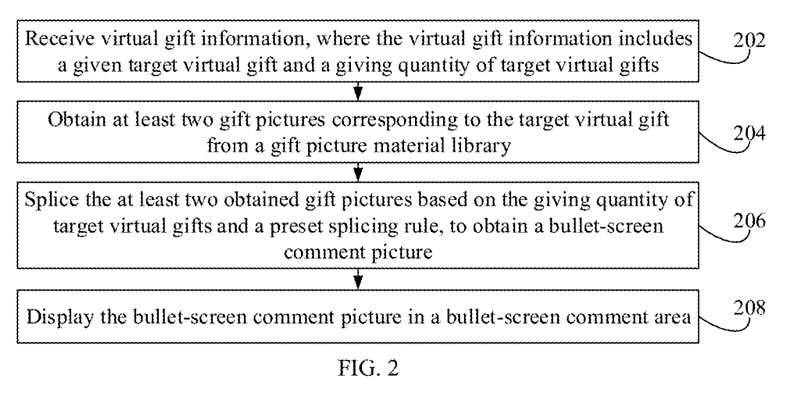
FIG. 2 is a flowchart of a virtual gift display method according to some embodiments of this application.

FIG. 2 is a flowchart of a virtual gift display method according to some embodiments of this application. The method specifically includes the following steps.

Step 202: Receive virtual gift information, where the virtual gift information includes a given target virtual gift and a giving quantity of target virtual gifts.

Specifically, the virtual gift information may be related information of a virtual gift given by a user, and the virtual gift information may include information such as a gift identifier of a target virtual gift given by the user and a giving quantity.

It should be noted that, in a process in which the user watches livestreaming, if the user is interested in livestreaming content or an online streamer, the user may give a virtual gift to the online streamer. The virtual gift may be a gift that is included in a live room and that may be given to the online streamer. After the virtual gift is given to the online streamer, the virtual gift may be converted into a corresponding quantity of virtual resources, and distributed to an account of the online streamer. For example, the virtual gift may be a heart, a flower, a yacht, a light board, an expression, or a support word in the live room. For example, it is assumed that one heart corresponds to five virtual resources. If the user gives five hearts to the online streamer, 25 virtual resources may be distributed to the account of the online streamer.

In an actual application, a client may receive virtual gift information sent by a server. The virtual gift information includes the related information of the virtual gift given by the user, for example, information indicating a specific gift that is the given virtual gift (that is, the target virtual gift), a giving quantity (that is, the giving quantity of target virtual gifts), or the like. Subsequently, the client may obtain a corresponding gift picture based on the received virtual gift information, and obtain a corresponding bullet-screen comment picture through splicing, to display the given gift in a bullet-screen comment form.

In some embodiments, the user may first initiate a gift giving request by using the client. After receiving the request, the server may broadcast the virtual gift information to each client through which livestreaming is watched. In other words, before the virtual gift information is received, the method may further include:

selecting the target virtual gift from a gift backpack of the live room in a livestreaming process; and sending a gift giving request to the server based on the target virtual gift.

Correspondingly, a specific implementation process of receiving the virtual gift information may be:

receiving virtual gift information broadcast by the server based on the gift giving request.

Specifically, the gift backpack may be a set of virtual gifts that can be given in the live room. The gift giving request may be a request for giving a virtual gift or some virtual gifts to the online streamer. The gift giving request may be initiated by the user after the user selects the target virtual gift from the gift backpack.

In an actual application, after selecting and confirming the target virtual gift from the gift backpack, the user may send the gift giving request to the server. The gift giving request may carry related information such as the gift identifier of the given target virtual gift and the giving quantity. To feed back a result of giving the virtual gift by the user, after receiving the gift giving request, the server may broadcast the corresponding virtual gift information based on the gift giving request, so that each client through which livestreaming is watched can receive the virtual gift information, and display the virtual gift information. In this way, each user watching livestreaming can learn of related giving information.

In addition, after receiving the gift giving request, the server indicates that the user gives the target virtual gift to the online streamer. In this case, in addition to broadcasting the corresponding virtual gift information to the client, the server may further parse the gift giving request, to obtain the target virtual gift given by the user and the giving quantity, to distribute the corresponding virtual resource to the account of the online streamer of the live room.

Figure 3:
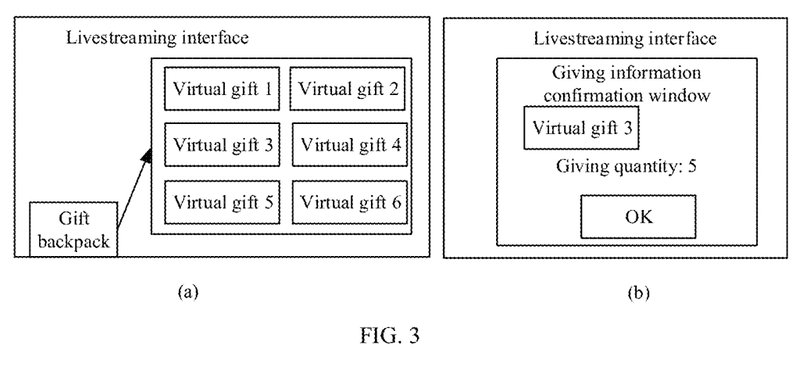
FIG. 3 is a schematic diagram of a livestreaming interface according to some embodiments of this application.

For example, FIG. 3 is a schematic diagram of a livestreaming interface according to some embodiments of this application. As shown in (a) in FIG. 3, after a user A taps a gift backpack in a livestreaming interface, a virtual gift 1, a virtual gift 2, a virtual gift 3, a virtual gift 4, a virtual gift 5, and a virtual gift 6 that wait to be selected pop up. It is assumed that the user A selects the virtual gift 3. In this case, a giving information confirmation pop-up window shown in (b) in FIG. 3 may pop up. It is assumed that a giving quantity selected by the user A is 5. After tapping an "OK" control, the client sends a gift giving request to the server. The gift giving request carries information indicating that the given target virtual gift is the virtual gift 3 and the giving quantity is 5. It is assumed that one virtual gift 3 corresponds to five virtual resources. After receiving the gift giving request, the server may distribute 25 virtual resources to the account of the online streamer in the live room, and simultaneously broadcast virtual gift information. The virtual gift information includes the information indicating that the given target virtual gift is the virtual gift 3 and the giving quantity is 5.

In this application, the user may select, from the gift backpack of the live room, a virtual gift that is expected to be given to the online streamer. In this case, the client may send the gift giving request to the server, to give the selected virtual gift to the online streamer. After receiving the gift giving request, the server may broadcast the corresponding virtual gift information, so that each client through which livestreaming is watched can receive the virtual gift information, to feed back a virtual gift giving result to each user watching livestreaming, thereby improving user experience and improving gift giving initiative.

In some embodiments, a designer may preset a gift picture corresponding to the virtual gift, and store the gift picture in a gift picture material library, so that the client can obtain the preset gift picture material library from the server subsequently, and execute a subsequent gift picture splicing process. In other words, before the virtual gift information is received, the method may further include:

obtaining the gift picture material library from the server at a preset moment, where the gift picture material library is a set of gift pictures preset for a preset virtual gift; and locally storing the gift picture material library.

Specifically, the preset moment may be a moment that is preset. The preset moment indicates a time point at which the client obtains the gift picture material library from the server. For example, the preset moment may be the 30th second, the 1st minute, or the 5th minute after the live room is entered.

It should be noted that, for each common virtual gift, the designer may set at least two gift pictures corresponding to the virtual gift, and different virtual gifts may correspond to different quantities of gift pictures. After all gift pictures corresponding to one virtual gift are spliced, a bullet-screen comment picture corresponding to the virtual gift when the giving quantity is 1 may be obtained.

In a specific implementation, the designer may pre-obtain a plurality of preset virtual gifts, set at least two corresponding gift pictures for each preset virtual gift, configure a picture identifier for each gift picture, and correspondingly store a gift identifier of the preset virtual gift and a picture identifier of a corresponding gift picture in the gift picture material library in the server. In other words, the gift picture material library stores a correspondence table between a gift identifier and a picture identifier, and stores a gift picture that carries a picture identifier. Subsequently, when the preset moment is reached, the client sends an obtaining request to the server, and the server may return the gift picture material library to the client, so that a required gift picture is obtained based on the gift picture material library.

For example, it is assumed that the preset virtual gifts are the virtual gift 1, the virtual gift 2, the virtual gift 3, the virtual gift 4, the virtual gift 5, and the virtual gift 6, gift pictures corresponding to the virtual gift 1 are a picture 11 and a picture 12, gift pictures corresponding to the virtual gift 2 are a picture 21, a picture 22, and a picture 23, gift pictures corresponding to the virtual gift 3 are a picture 31, a picture 32, and a picture 33, gift pictures corresponding to the virtual gift 4 are a picture 41 and a picture 42, gift pictures corresponding to the virtual gift 5 are a picture 51, a picture 52, a picture 53, a picture 54, a picture 55, and a picture 56, and gift pictures corresponding to the virtual gift 6 are a picture 61, a picture 62, and a picture 63. A gift identifier of each preset virtual gift and a picture identifier of a corresponding gift picture are correspondingly stored, to obtain a correspondence table between a gift identifier and a picture identifier shown in Table 1.

TABLE 1

Correspondence table between a gift identifier and a picture identifier

| Gift identifier | Picture identifier |
| --- | --- |
| Virtual gift 1 | Picture 11 and picture 12 |
| Virtual gift 2 | Picture 21, picture 22, and picture 23 |
| Virtual gift 3 | Picture 31, picture 32, and picture 33 |
| Virtual gift 4 | Picture 41 and picture 42 |
| Virtual gift 5 | Picture 51, picture 52, picture 53, picture 54, picture 55, and picture 56 |
| Virtual gift 6 | Picture 61, picture 62, and picture 63 |

In this application, the designer may preset, by using the server, at least two gift pictures corresponding to each virtual gift, and correspondingly store the at least two gift pictures in the gift picture material library. Subsequently, after the preset moment is reached, the client may obtain the gift picture material library from the server, and locally store the gift picture material library, so that when a bullet-screen comment picture needs to be obtained through splicing subsequently, a gift picture required for splicing can be directly obtained from the locally stored gift picture material library, without a need to be obtained from the server again, to improve splicing efficiency, thereby improving display efficiency of the bullet-screen comment picture of the virtual gift, and ensuring user experience.

Step 204: Obtain at least two gift pictures corresponding to the target virtual gift from the gift picture material library.

Specifically, based on a case in which the client receives the virtual gift information, the client may further obtain the at least two gift pictures corresponding to the target virtual gift from the gift picture material library, so that a corresponding bullet-screen comment picture can be obtained through splicing subsequently.

It should be noted that the target virtual gift may correspond to at least two gift pictures. When setting the gift picture material library, the designer sets a plurality of gift pictures for the virtual gift. In this case, all corresponding gift pictures may be obtained based on the target virtual gift, and are used to obtain a corresponding bullet-screen comment picture through splicing subsequently.

In an actual application, the virtual gift information may include the gift identifier of the target virtual gift given by the user. After receiving the virtual gift information, the client may parse the virtual gift information, to obtain the gift identifier of the target virtual gift in the virtual gift information, determine each picture identifier corresponding to the target virtual gift based on the correspondence table between a gift identifier and a picture identifier that is stored in the gift picture material library, and obtain a gift picture corresponding to each picture identifier from the gift picture material library, so that the obtained gift picture is subsequently spliced, to obtain a corresponding gift picture.

The example is still used. It is assumed that the user gives the virtual gift 3 to the online streamer. In other words, the gift identifier that is of the target virtual gift and that is included in the virtual gift information is the virtual gift 3. It may be determined, based on the correspondence table between a gift identifier and a picture identifier shown in Table 1, that picture identifiers corresponding to the virtual gift 3 are the picture 31, the picture 32, and the picture 33. In this case, gift pictures whose picture identifiers are the picture 31, the picture 32, and the picture 33 may be obtained from the gift picture material library. The gift picture is a gift picture corresponding to the target virtual gift in the virtual gift information received by the client.

In some embodiments, the at least two gift pictures corresponding to the target virtual gift can be obtained from the gift picture material library only when the at least two corresponding gift pictures are preset for the target virtual gift in the virtual gift information. Whether the target virtual gift in the virtual gift information is a virtual gift for which a gift picture is preset may be determined before the at least two gift pictures corresponding to the target virtual gift are obtained, to avoid performing a redundant operation and wasting processing resources. In other words, before the at least two gift pictures corresponding to the target virtual gift are obtained from the gift picture material library, the method may further include:

parsing the virtual gift information, to obtain the gift identifier of the target virtual gift in the virtual gift information;

determining whether the gift identifier is a preset gift identifier; and when the gift identifier is a preset gift identifier, performing the operation step of obtaining at least two gift pictures corresponding to the target virtual gift from the gift picture material library.

It should be noted that, the virtual gift information may be parsed, to obtain the gift identifier of the target virtual gift in the virtual gift information, and then whether the gift identifier is a preset gift identifier is determined. The preset gift identifier is an identifier of a virtual gift for which a corresponding gift picture is preset. In other words, the preset gift identifier may be a gift identifier included in the correspondence table between a gift identifier and a picture identifier that is stored in the gift picture material library.

In an actual application, after the virtual gift information is parsed, to obtain the gift identifier of the target virtual gift in the virtual gift information, the correspondence table between a gift identifier and a picture identifier that is stored in the gift picture material library may be searched. If the gift identifier of the target virtual gift is found, it indicates that the gift identifier of the target virtual gift is a preset gift identifier. Subsequently, the picture identifier corresponding to the gift identifier of the target virtual gift may be determined based on the correspondence table between a gift identifier and a picture identifier, and further, a corresponding gift picture is obtained from the gift picture material library.

In addition, if the gift identifier of the target virtual gift cannot be found, it indicates that no corresponding gift picture is previously set for the target virtual gift. In this case, the operation step of obtaining the at least two gift pictures corresponding to the target virtual gift from the gift picture material library may not be performed, and a splicing operation is not performed either. In a specific implementation, if the gift identifier of the target virtual gift cannot be found, a text bullet-screen comment indicating that obtaining of the gift picture fails may be displayed, and the virtual gift information is displayed in the text bullet-screen comment in a text form; or a new layer may be created in a conventional manner, and the virtual gift information is displayed at the layer. This is not limited in this application.

It should be noted that, if obtaining of the gift picture fails, the client may further return an update reminder request to the server, to remind the designer that the gift picture material library may be updated by using the server, to add, to the gift picture material library, at least two gift pictures corresponding to a virtual gift of which obtaining fails. After the server updates the gift picture material library, the client may actively return the updated gift picture material library to the client, or may not push the updated gift picture material library to the client until the client initiates the obtaining request next time.

In this application, after the virtual gift information is received, whether a corresponding gift picture is previously set may be first determined based on the gift identifier of the target virtual gift in the virtual gift information. If the corresponding gift picture is previously set, the operation step of obtaining the at least two gift pictures corresponding to the target virtual gift from the gift picture material library is performed. In other words, the at least two gift pictures are obtained when it is determined that the gift picture material library includes the at least two gift pictures corresponding to the target virtual gift, to avoid performing a redundant useless operation and saving processing resources.

Step 206: Splice the at least two obtained gift pictures based on the giving quantity of target virtual gifts and a preset splicing rule, to obtain a bullet-screen comment picture.

Specifically, based on a case in which the client obtains the at least two gift pictures corresponding to the target virtual gift from the gift picture material library, further, the client may splice the at least two obtained gift pictures based on the giving quantity of target virtual gifts and the preset splicing rule, to obtain the bullet-screen comment picture. The preset splicing rule may be a rule of splicing all obtained gift pictures, that is, a rule of how to splice all the obtained gift pictures to obtain a bullet-screen comment picture that finally needs to be displayed. For example, the preset splicing rule may be an arrangement sequence of all the gift pictures. In addition, the bullet-screen comment picture may be a picture that can be displayed in the bullet-screen comment form.

It should be noted that, there may be a plurality of obtained gift pictures. Therefore, the plurality of gift pictures may be arranged and spliced together based on the predefined preset splicing rule, to obtain a bullet-screen comment picture that finally needs to be displayed.

In an actual application, the giving quantity of target virtual gifts may be at least one. In some embodiments of this application, all gift pictures corresponding to the target virtual gift may be spliced based on the giving quantity of target virtual gifts. Therefore, when the giving quantity is 1, only all gift pictures corresponding to the target virtual gift are spliced in sequence. When the giving quantity is greater than 1, a required splicing quantity of each gift picture corresponding to the target virtual gift may be determined based on a specific giving quantity of target virtual gifts and a corresponding splicing rule, and pictures whose quantity is the determined splicing quantity are spliced. In other words, n (the giving quantity of target virtual gifts)*m (a quantity of gift pictures corresponding to one target virtual gift) pictures are spliced, to obtain a final bullet-screen comment picture for display.

In a possible implementation, a corresponding preset splicing rule may be further preset for the virtual gift. To be specific, a rule of arranging the at least two gift pictures corresponding to the virtual gift subsequently may be predefined. Different virtual gifts may correspond to different preset splicing rules. Therefore, before the at least two obtained gift pictures are spliced based on the giving quantity of target virtual gifts and the preset splicing rule, to obtain the bullet-screen comment picture, the preset splicing rule corresponding to the target virtual gift may be first determined based on the gift identifier of the target virtual gift, and then the at least two obtained gift pictures may be spliced based on the preset splicing rule.

In another possible implementation, a corresponding preset splicing rule may be set for a type of virtual gift. In this case, the virtual gift information may include a gift type; and before the at least two obtained gift pictures are spliced based on the giving quantity of target virtual gifts and the preset splicing rule, to obtain the bullet-screen comment picture, the method may further include:

parsing the virtual gift information, to obtain the gift type in the virtual gift information; and determining a preset splicing rule corresponding to the gift type.

It should be noted that, the corresponding preset splicing rule may be preset for the type of virtual gift. Subsequently, for all virtual gifts of this type, at least two obtained gift pictures may be spliced based on the preset splicing rule. In this case, the client may further store a correspondence between a gift type and a preset splicing rule. The correspondence between a gift type and a preset splicing rule may be a correspondence that is obtained by the client from the server and that is preset and stored in the server by the designer.

In some embodiments, a specific implementation process of splicing the at least two obtained gift pictures based on the giving quantity of target virtual gifts and the preset splicing rule, to obtain the bullet-screen comment picture may be:

determining a splicing quantity of each gift picture based on the giving quantity of target virtual gifts and the preset splicing rule; and splicing, based on the preset splicing rule, gift pictures whose quantity is the splicing quantity, to obtain the bullet-screen comment picture.

It should be noted that, in a case of different quantities of virtual gifts and different preset splicing rules, different quantities may be required for each gift picture. Therefore, the splicing quantity of each gift picture may be determined based on the giving quantity of target virtual gifts and the preset splicing rule. For example, the preset splicing rule may include an arrangement sequence of all gift pictures and an arrangement rule. A quantity of times that each gift picture needs to be repeatedly used may be determined based on the arrangement sequence, the arrangement rule, and the giving quantity of target virtual gifts, to determine the required splicing quantity of each gift picture.

For example, the virtual gift information is that five special symbol items "233" are given. It is assumed that a preset splicing rule corresponding to the special symbol items is as follows: The 1st symbol picture in the special symbol items is displayed at the beginning, and is displayed for only one time, and symbol pictures other than the first symbol picture are repeatedly spliced based on the giving quantity. Because 15 gift pictures are required for the five special symbol items "233", and a first symbol picture "2" is displayed for only one time, symbol pictures "3" are required for all the remaining 14 gift pictures. In this case, it may be determined that one gift picture "2" is required, and 14 gift pictures "3" are required.

In some embodiments, after the splicing quantity of each gift picture is determined, the gift pictures whose quantity is the splicing quantity may be arranged in a preset sequence, and spliced to obtain the bullet-screen comment picture. That is, the preset splicing rule may include a gift picture arrangement sequence. In this case, a specific implementation process of splicing, based on the preset splicing rule, the gift pictures whose quantity is the splicing quantity, to obtain the bullet-screen comment picture may be:

arranging, in the gift picture arrangement sequence, the gift pictures whose quantity is the splicing quantity; and splicing the arranged gift pictures into the bullet-screen comment picture.

It should be noted that, after the required splicing quantity of each gift picture is determined, all the gift pictures may be arranged in the gift picture arrangement sequence, and then the arranged gift pictures are spliced together, to obtain the bullet-screen comment picture corresponding to the virtual gift information.

Figure 4:
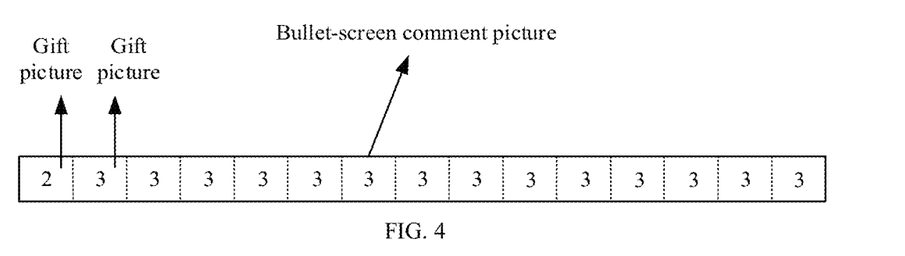
FIG. 4 is a schematic diagram of a bullet-screen comment picture according to some embodiments of this application.

The foregoing example is still used. It is determined that one gift picture "2" and 14 gift pictures "3" are required. It is assumed that the gift picture arrangement sequence is that the 1st symbol picture is displayed at the beginning, and the remaining matching pictures are displayed after the 1st symbol picture. In this case, the gift picture "2" may be arranged in the 1st position, and the 14 gift pictures "3" are arranged in sequence after the gift picture "2". Then, all the gift pictures arranged in sequence are spliced, to obtain a corresponding bullet-screen comment picture. FIG. 4 is a schematic diagram of a bullet-screen comment picture according to some embodiments of this application.

In addition, because the bullet-screen comment picture obtained by splicing all the gift pictures needs to be subsequently displayed in the bullet-screen comment form, but a size requirement is usually imposed on a picture displayed in a bullet-screen comment, before the gift pictures whose quantity is the splicing quantity are arranged in the arrangement sequence, the gift pictures whose quantity is the splicing quantity may be first processed into a picture of a size that can be used for display in the bullet-screen comment, and then are spliced, to obtain a bullet-screen comment picture that can be finally and directly displayed in the bullet-screen comment form.

In some embodiments, the virtual gift information may further include a user identifier. When all the gift pictures are spliced, the user identifier may also be spliced. In this case, the finally obtained bullet-screen comment picture may include the user identifier. To be specific, a specific implementation process of splicing the at least two obtained gift pictures based on the giving quantity of target virtual gifts and the preset splicing rule, to obtain the bullet-screen comment picture may further be:

splicing the at least two obtained gift pictures and the user identifier based on the giving quantity of target virtual gifts and a preset splicing rule, to obtain the bullet-screen comment picture.

Specifically, the user identifier may be a user avatar, a user name, a user account, or the like.

It should be noted that, if the user identifier is a user avatar, that is, the user identifier is a picture type, the user avatar and each gift picture may be directly arranged in corresponding positions (for example, the user avatar is arranged in the first position) based on the preset splicing rule, to obtain the bullet-screen comment picture through splicing. If the user identifier is a user name or a user account, that is, the user identifier is a text type, the user name or the user account may be first processed into a picture, and then the picture and each gift picture are arranged in corresponding positions, to obtain the bullet-screen comment picture through splicing.

In addition, in an actual application, if the user identifier is a text type such as a user name or a user account, the user identifier may not be processed into a picture, but a user identifier of a text type directly covers a gift picture, and all the gift pictures are arranged in corresponding positions, to obtain the bullet-screen comment picture through splicing.

In this application, the user identifier in the virtual gift information may be obtained, and then the user identifier is also spliced. The bullet-screen comment picture obtained through splicing may include the user identifier. Subsequently, the bullet-screen comment picture obtained through splicing is directly displayed in the bullet-screen comment form, so that information about a given virtual gift and information about a giving user may be simultaneously displayed, to improve user experience.

Step 208: Display the bullet-screen comment picture in a bullet-screen comment area.

Specifically, based on a case in which the at least two obtained gift pictures are spliced based on the giving quantity of target virtual gifts and the preset splicing rule, to obtain the bullet-screen comment picture, the client may further display the bullet-screen comment picture in the bullet-screen comment area, that is, display, in the bullet-screen comment form, the bullet-screen comment picture obtained through splicing.

In a possible implementation, if a size of each gift picture is processed before all the gift pictures are spliced, the bullet-screen comment picture obtained through splicing is a picture that can be directly displayed in the bullet-screen comment form. In this case, the bullet-screen comment picture may be directly displayed as a bullet-screen comment in the bullet-screen comment area in a livestreaming interface by using a bullet-screen comment player.

In another possible implementation, if a size of each gift picture is not processed before all the gift pictures are spliced, the bullet-screen comment picture obtained through splicing may not be directly displayed in the bullet-screen comment form. Instead, the bullet-screen comment picture obtained through splicing needs to be processed into a picture of a size that can be used for display in the bullet-screen comment form, and then is displayed in the bullet-screen comment form. In other words, the bullet-screen comment picture is displayed in the bullet-screen comment area. A specific implementation process may further be:

performing picture processing on the bullet-screen comment picture, to obtain a display picture with a bullet-screen comment size; and displaying the display picture with the bullet-screen comment size in the bullet-screen comment area.

It should be noted that, after all the gift pictures are spliced, to obtain a bullet-screen comment picture that finally needs to be displayed, picture processing may be further performed on the bullet-screen comment picture, to obtain a display picture of a bullet-screen comment size. The bullet-screen comment size may be a size of a picture that can be displayed in the bullet-screen comment form.

Figure 5:
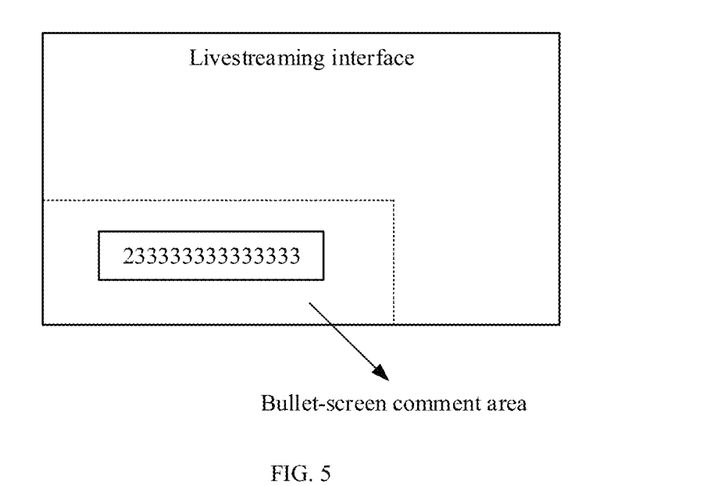
FIG. 5 is a schematic diagram of displaying a bullet-screen comment picture according to some embodiments of this application.

For example, FIG. 5 is a schematic diagram of displaying a bullet-screen comment picture according to some embodiments of this application. It is assumed that the bullet-screen comment picture obtained through splicing is shown in FIG. 4. The bullet-screen comment picture may be displayed in the bullet-screen comment area in the bullet-screen comment form by using the bullet-screen comment player, as shown in FIG. 5.

According to the virtual gift display method provided in this application, gift pictures corresponding to different virtual gifts may be predefined, to generate the gift picture material library, and preset splicing rules of different virtual gifts are predefined. The client may obtain the at least two gift pictures corresponding to the target virtual gift from the pre-generated gift picture material library, splice all the obtained gift pictures based on the predefined splicing rules, to obtain a bullet-screen comment picture of the virtual gift given by the user, and display the bullet-screen comment picture in the bullet-screen comment area in the bullet-screen comment form. In this way, the virtual gift given by the user can be displayed by using a bullet-screen comment function built in the live room, without a need to redevelop a virtual gift display function, to greatly reduce development costs and development time. In addition, a bullet-screen comment and a gift giving function may be combined, to improve user experience. In addition, at least two to-be-displayed gift pictures and a splicing rule may be predefined for the virtual gift. In other words, different virtual gifts may be displayed in different forms, to greatly improve virtual gift display flexibility, and improve user experience.

Figure 6:
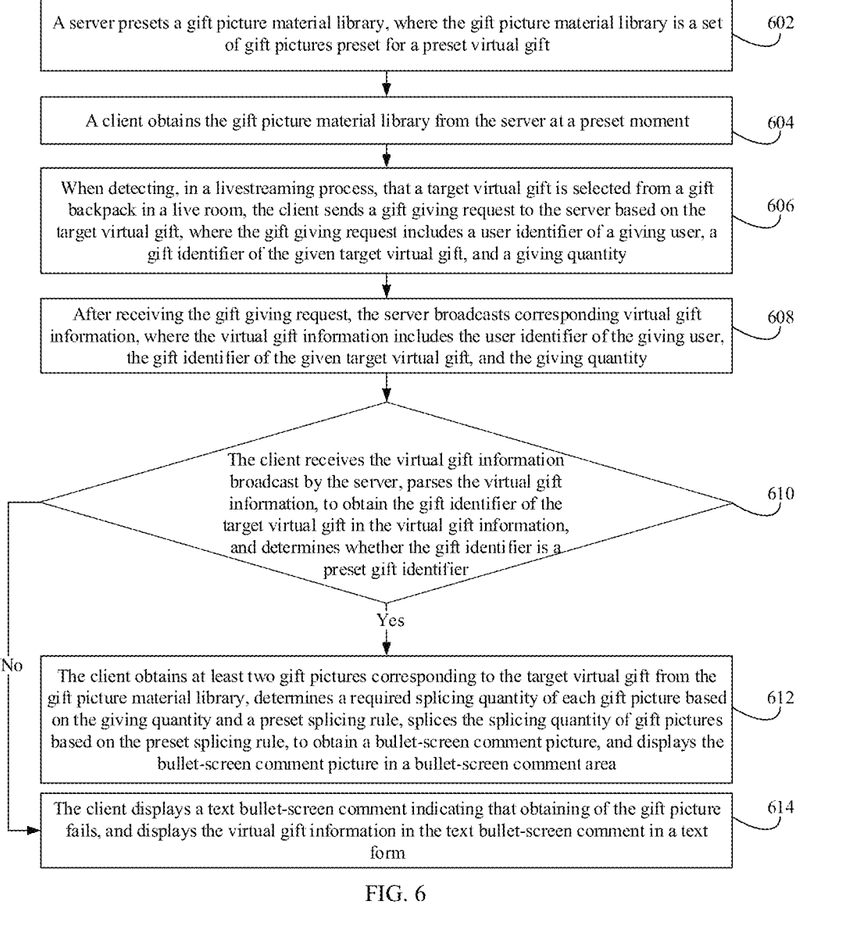
FIG. 6 is a flowchart of another virtual gift display method according to some embodiments of this application.

FIG. 6 is a flowchart of another virtual gift display method according to some embodiments of this application. The method specifically includes the following steps.

Step 602: A server presets a gift picture material library, where the gift picture material library is a set of gift pictures preset for a preset virtual gift.

Step 604: A client obtains the gift picture material library from the server at a preset moment.

Step 606: When detecting, in a livestreaming process, that a target virtual gift is selected from a gift backpack of a live room, the client sends a gift giving request to the server based on the target virtual gift, where the gift giving request includes a user identifier of a giving user, a gift identifier of the given target virtual gift, and a giving quantity.

Step 608: After receiving the gift giving request, the server broadcasts corresponding virtual gift information, where the virtual gift information includes the user identifier of the giving user, the gift identifier of the given target virtual gift, and the giving quantity of target virtual gifts.

Step 610: The client receives the virtual gift information broadcast by the server, parses the virtual gift information, to obtain the gift identifier of the target virtual gift in the virtual gift information, determines whether the gift identifier is a preset gift identifier, and performs step 612 if the gift identifier is a preset gift identifier, or performs step 614 if the gift identifier is not a preset gift identifier.

Step 612: The client obtains at least two gift pictures corresponding to the target virtual gift from the gift picture material library, determines a required splicing quantity of each gift picture based on the giving quantity of target virtual gifts and a preset splicing rule, splices, based on the preset splicing rule, gift pictures whose quantity is the splicing quantity, to obtain a bullet-screen comment picture, and displays the bullet-screen comment picture in a bullet-screen comment area.

Step 614: The client displays a text bullet-screen comment indicating that obtaining of the gift picture fails, and displays the virtual gift information in the text bullet-screen comment in a text form.

According to the virtual gift display method provided in this application, gift pictures corresponding to different virtual gifts may be predefined, to generate the gift picture material library, and preset splicing rules of different virtual gifts are predefined. The client may obtain the at least two gift pictures corresponding to the target virtual gift from the pre-generated gift picture material library, splice all the obtained gift pictures based on the predefined splicing rules, to obtain a bullet-screen comment picture of a virtual gift given by the user, and display the bullet-screen comment picture in the bullet-screen comment area in a bullet-screen comment form. In this way, the virtual gift given by the user can be displayed by using a bullet-screen comment function built in the live room, without a need to redevelop a virtual gift display function, to greatly reduce development costs and development time. In addition, the bullet-screen comment and a gift giving function may be combined, to improve user experience. In addition, at least two to-be-displayed gift pictures and a splicing rule may be predefined for the virtual gift. In other words, different virtual gifts may be displayed in different forms, to greatly improve virtual gift display flexibility, and improve user experience.

Figure 7:
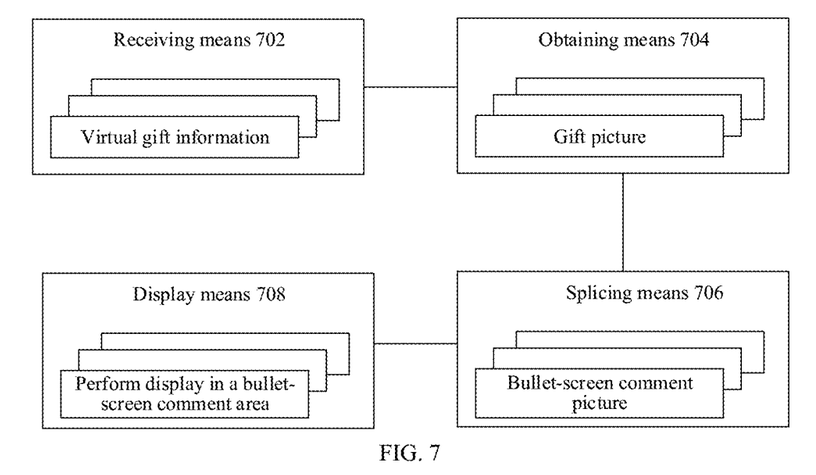
FIG. 7 is a schematic diagram of a structure of a virtual gift display apparatus according to some embodiments of this application.

Corresponding to the method embodiments, this application further provides some embodiments of a virtual gift display apparatus. FIG. 7 is a schematic diagram of a structure of a virtual gift display apparatus according to some embodiments of this application. As shown in FIG. 7, the apparatus includes:

a receiving means 702, configured to receive virtual gift information, where the virtual gift information includes a given target virtual gift and a giving quantity of target virtual gifts;

an obtaining means 704, configured to obtain at least two gift pictures corresponding to the target virtual gift from a gift picture material library;

a splicing means 706, configured to splice the at least two obtained gift pictures based on the giving quantity of target virtual gifts and a preset splicing rule, to obtain a bullet-screen comment picture; and a display means 708, configured to display the bullet-screen comment picture in a bullet-screen comment area.

In some embodiments, the apparatus further includes a first determining means, configured to:

parse the virtual gift information, to obtain a gift identifier of the target virtual gift in the virtual gift information;

determine whether the gift identifier is a preset gift identifier; and when the gift identifier is a preset gift identifier, execute an operation performed by the obtaining means 704.

In some embodiments, the virtual gift information includes a gift type; and the apparatus further includes a second determining means, configured to:

parse the virtual gift information, to obtain the gift type in the virtual gift information; and determine a preset splicing rule corresponding to the gift type.

In some embodiments, the splicing means 706 is further configured to:

determine a splicing quantity of each gift picture based on the giving quantity of target virtual gifts and the preset splicing rule; and splice, based on the preset splicing rule, gift pictures whose quantity is the splicing quantity, to obtain the bullet-screen comment picture.

In some embodiments, the preset splicing rule includes a gift picture arrangement sequence; and the splicing means 706 is further configured to:

arrange, in the gift picture arrangement sequence, the gift pictures whose quantity is the splicing quantity; and splice the arranged gift pictures into the bullet-screen comment picture.

In some embodiments, the apparatus further includes a storage means, configured to:

obtain the gift picture material library from the server at a preset moment, where the gift picture material library is a set of gift pictures preset for a preset virtual gift; and locally store the gift picture material library.

In some embodiments, the apparatus further includes a sending means, configured to:

select the target virtual gift from a gift backpack of a live room in a livestreaming process; and send a gift giving request to the server based on the target virtual gift.

Correspondingly, the receiving means 702 is further configured to:

receive virtual gift information broadcast by the server based on the gift giving request.

In some embodiments, the virtual gift information includes a user identifier; and the splicing means 706 is further configured to:

splice the at least two obtained gift pictures and the user identifier based on the giving quantity of target virtual gifts and a preset splicing rule, to obtain the bullet-screen comment picture.

In some embodiments, the display means 708 is further configured to:

perform picture processing on the bullet-screen comment picture, to obtain a display picture with a bullet-screen comment size; and display the display picture with the bullet-screen comment size in the bullet-screen comment area.

According to the virtual gift display apparatus provided in this application, gift pictures corresponding to different virtual gifts may be predefined, to generate a gift picture material library, and preset splicing rules of different virtual gifts are predefined. The client may obtain the at least two gift pictures corresponding to the target virtual gift from the pre-generated gift picture material library, splice all the obtained gift pictures based on the predefined splicing rules, to obtain a bullet-screen comment picture of the virtual gift given by the user, and display the bullet-screen comment picture in the bullet-screen comment area in the bullet-screen comment form. In this way, the virtual gift given by the user can be displayed by using a bullet-screen comment function built in the live room, without a need to redevelop a virtual gift display function, to greatly reduce development costs and development time. In addition, the bullet-screen comment and a gift giving function may be combined, to improve user experience. In addition, at least two to-be-displayed gift pictures and a splicing rule may be predefined for the virtual gift. In other words, different virtual gifts may be displayed in different forms, to greatly improve virtual gift display flexibility, and improve user experience.

The foregoing describes a schematic solution of the virtual gift display apparatus in the embodiments. It should be noted that the technical solution of the virtual gift display apparatus and the technical solutions of the virtual gift display methods belong to the same concept. For details not described in the technical solution of the virtual gift display apparatus, refer to the descriptions of the technical solutions of the virtual gift display methods.

Figure 8:
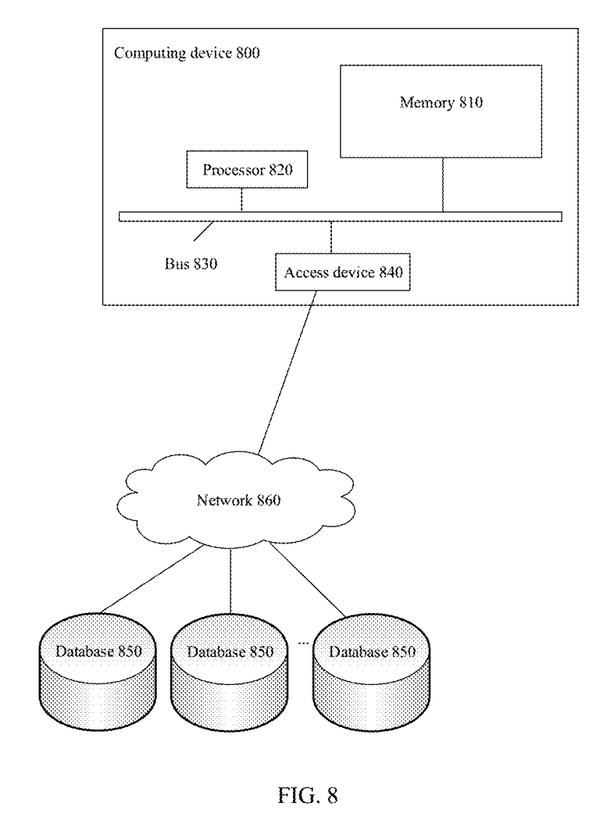
FIG. 8 is a block diagram of a structure of a computing device according to some embodiments of this application.

FIG. 8 is a block diagram of a structure of a computing device 800 according to some embodiments of this application. Components of the computing device 800 include but are not limited to a memory 810 and a processor 820. The processor 820 is connected to the memory 810 through a bus 830, and a database 850 is configured to store data.

The computing device 800 further includes an access device 840. The access device 840 enables the computing device 800 to communicate through one or more networks 860. Examples of these networks include a public switched telephone network (PSTN), a local area network (LAN), a wide area network (WAN), a private area network (PAN), or a combination of communication networks such as the Internet. The access device 840 may include one or more of any type of wired or wireless network interface (for example, a network interface card (NIC)), for example, an IEEE 802.11 wireless local area network (WLAN) wireless interface, a worldwide interoperability for microwave access (Wi-MAX) interface, an Ethernet interface, a universal serial bus (USB) interface, a cellular network interface, a Bluetooth interface, or a near field communication (NFC) interface.

In some embodiments of this application, the foregoing components of the computing device 800 and other components not shown in FIG. 8 may be connected to each other, for example, through a bus. It should be understood that, the block diagram of the structure of the computing device shown in FIG. 8 is merely an example, and is not intended to limit the scope of this application. A person skilled in the art can add or replace other components based on a requirement.

The computing device 800 may be any type of stationary or mobile computing device, including a mobile computer or a mobile computing device (for example, a tablet computer, a personal digital assistant, a laptop computer, a notebook computer, or a netbook), a mobile phone (for example, a smartphone), a wearable computing device (for example, a smartwatch or smart glasses), or another type of mobile device, or a stationary computing device such as a desktop computer or a PC. The computing device 800 may alternatively be a mobile or stationary server.

The processor 820 is configured to execute the following computer-executable instructions, to implement the following method:

receiving virtual gift information, where the virtual gift information includes a given target virtual gift and a giving quantity of target virtual gifts;

obtaining at least two gift pictures corresponding to the target virtual gift from a gift picture material library;

splicing the at least two obtained gift pictures based on the giving quantity of target virtual gifts and a preset splicing rule, to obtain a bullet-screen comment picture; and displaying the bullet-screen comment picture in a bullet-screen comment area.

The foregoing describes a schematic solution of the computing device in the embodiments. It should be noted that the technical solution of the computing device and the technical solutions of the virtual gift display methods belong to a same concept. For details not described in detail in the technical solution of the computing device, refer to the descriptions of the technical solutions of the virtual gift display methods.

Some embodiments of this application further provide a computer-readable storage medium. The computer-readable storage medium stores computer-executable instructions, and the computer-executable instructions are executed by a processor, to implement any step of the virtual gift display method.

The foregoing describes a schematic solution of the computer-readable storage medium in the embodiments. It should be noted that the technical solution of the storage medium and the technical solutions of the virtual gift display methods belong to a same concept. For details not described in detail in the technical solution of the storage medium, refer to the descriptions of the technical solutions of the virtual gift display methods.

Some embodiments of this application further provide a computer program product. When the computer program product is executed on a computer, the computer is enabled to perform any of steps of the virtual gift display method.

The foregoing describes a schematic solution of the computer program product in the embodiments. It should be noted that the technical solution of the computer program product and the technical solutions of the virtual gift display methods belong to a same concept. For details not described in detail in the technical solution of the computer program product, refer to the descriptions of the technical solutions of the virtual gift display methods.

The foregoing describes specific embodiments of this application. Other embodiments fall within the scope of the appended claims. In some cases, actions or steps recorded in the claims may be performed in a sequence different from that in the embodiments and desired results may still be achieved. In addition, processes described in the accompanying drawings do not necessarily require a specific order or a sequential order shown to achieve the desired results. In some implementations, multitasking and parallel processing are also possible or may be advantageous.

The computer instructions include computer program code, and the computer program code may be in a source code form, an object code form, an executable file form, some intermediate forms, or the like. The computer-readable medium may include any entity or apparatus capable of carrying the computer program code, a recording medium, a USB flash drive, a removable hard disk, a magnetic disk, an optical disc, a computer memory, a read-only memory (ROM), a random access memory (RAM), an electrical carrier signal, a telecommunications signal, a software distribution medium, and the like. It should be noted that the content included in the computer-readable medium can be appropriately added or deleted depending on requirements of the legislation and patent practice in a jurisdiction. For example, in some jurisdictions, according to the legislation and patent practice, the computer-readable medium does not include an electrical carrier signal or a telecommunications signal.

It should be noted that, for ease of description, the foregoing method embodiments are described as a combination of a series of actions. However, a person skilled in the art should understand that this application is not limited to the described action sequence, because according to this application, some steps may be performed in another sequence or simultaneously. In addition, a person skilled in the art should also be aware that the embodiments described in this specification are all preferred embodiments, and used actions and means are not necessarily mandatory to this application.

In the foregoing embodiments, the descriptions of various embodiments have respective focuses. For a part that is not described in detail in an embodiment, refer to related descriptions in other embodiments.

The preferred embodiments of this application disclosed above are merely intended to help describe this application. In some embodiments, not all details are described in detail, and the present invention is not limited to only the specific implementations. Clearly, many modifications and variations may be made based on the content of this application. In this application, these embodiments are selected and specifically described to better explain the principle and actual application of this application, so that a person skilled in the art can well understand and use this application. This application is only subject to the claims and a full scope and equivalents thereof.

What is claimed is:

1. A method, comprising:
  receiving virtual gift information, wherein the virtual gift information comprises a given target virtual gift and a giving quantity of target virtual gifts;
  obtaining at least two gift pictures corresponding to the target virtual gift from a gift picture material library;
  splicing the at least two obtained gift pictures based on the giving quantity of target virtual gifts and a preset splicing rule, to obtain a bullet-screen comment picture; and
  displaying the bullet-screen comment picture in a bullet-screen comment area.

2. The method according to claim 1, before the obtaining the at least two gift pictures corresponding to the target virtual gift from the gift picture material library, further comprising:
  parsing the virtual gift information, to obtain a gift identifier of the target virtual gift in the virtual gift information; and
  in response to determining that the gift identifier is a preset gift identifier, obtaining the at least two gift pictures corresponding to the target virtual gift from the gift picture material library.

3. The method according to claim 1, wherein the virtual gift information comprises a gift type; and before the splicing the at least two obtained gift pictures based on the giving quantity of target virtual gifts and the preset splicing rule, to obtain the bullet-screen comment picture, the method further comprises:
  parsing the virtual gift information, to obtain the gift type in the virtual gift information; and
  determining a preset splicing rule corresponding to the gift type.

4. The method according to claim 1, wherein the splicing the at least two obtained gift pictures based on the giving quantity of target virtual gifts and the preset splicing rule, to obtain the bullet-screen comment picture comprises:
  determining a splicing quantity of each gift picture based on the giving quantity of target virtual gifts and the preset splicing rule; and
  splicing, based on the preset splicing rule, gift pictures having a quantity equal to the splicing quantity, to obtain the bullet-screen comment picture.

5. The method according to claim 4, wherein the preset splicing rule comprises a gift picture arrangement sequence; and the splicing, based on the preset splicing rule, the gift pictures having a quantity equal to the splicing quantity, to obtain the bullet-screen comment picture comprises:
  arranging, in the gift picture arrangement sequence, the gift pictures having a quantity equal to the splicing quantity; and
  splicing the arranged gift pictures into the bullet-screen comment picture.

6. The method according to claim 1, before the receiving the virtual gift information, further comprising:
  obtaining the gift picture material library from a server at a preset moment, wherein the gift picture material library is a set of gift pictures preset for a preset virtual gift; and
  locally storing the gift picture material library.

7. The method according to claim 1, before the receiving the virtual gift information, further comprising:
  selecting the target virtual gift from a gift backpack of a live room in a livestreaming process; and
  sending a gift giving request to a server based on the target virtual gift; and
  correspondingly, the receiving the virtual gift information comprises:
  receiving virtual gift information broadcasted by the server based on the gift giving request.

8. The method according to claim 1, wherein the virtual gift information comprises a user identifier; and the splicing the at least two obtained gift pictures based on the giving quantity of target virtual gifts and the preset splicing rule, to obtain the bullet-screen comment picture comprises:
  splicing the at least two obtained gift pictures and the user identifier based on the giving quantity of target virtual gifts and the preset splicing rule, to obtain the bullet-screen comment picture.

9. The method according to claim 1, wherein the displaying the bullet-screen comment picture in the bullet-screen comment area comprises:
  performing picture processing on the bullet-screen comment picture, to obtain a display picture with a bullet-screen comment size; and
  displaying the display picture with the bullet-screen comment size in the bullet-screen comment area.

10. A computing device, comprising:
  one or more processors; and
  a memory, storing one or more programs configured to be executed by the one or more processors, the one or more programs comprising instructions for:
  receiving virtual gift information, wherein the virtual gift information comprises a given target virtual gift and a giving quantity of target virtual gifts;
  obtaining at least two gift pictures corresponding to the target virtual gift from a gift picture material library;

splicing the at least two obtained gift pictures based on the giving quantity of target virtual gifts and a preset splicing rule, to obtain a bullet-screen comment picture; and displaying the bullet-screen comment picture in a bullet-screen comment area.

11. The computing device according to claim 10, wherein the one or more programs further comprises instructions for: before the obtaining the at least two gift pictures corresponding to the target virtual gift from the gift picture material library, parsing the virtual gift information, to obtain a gift identifier of the target virtual gift in the virtual gift information; and in response to determining that the gift identifier is a preset gift identifier, performing the operation step of obtaining the at least two gift pictures corresponding to the target virtual gift from the gift picture material library.

12. The computing device according to claim 10, wherein the virtual gift information comprises a gift type; and the one or more programs further comprises instructions for: before the splicing the at least two obtained gift pictures based on the giving quantity of target virtual gifts and the preset splicing rule, to obtain the bullet-screen comment picture, parsing the virtual gift information, to obtain the gift type in the virtual gift information; and determining a preset splicing rule corresponding to the gift type.

13. The computing device according to claim 10, wherein the splicing the at least two obtained gift pictures based on the giving quantity of target virtual gifts and the preset splicing rule, to obtain the bullet-screen comment picture comprises:

determining a splicing quantity of each gift picture based on the giving quantity of target virtual gifts and the preset splicing rule; and splicing, based on the preset splicing rule, gift pictures having a quantity equal to the splicing quantity, to obtain the bullet-screen comment picture.

14. The computing device according to claim 13, wherein the preset splicing rule comprises a gift picture arrangement sequence; and the splicing, based on the preset splicing rule, the gift pictures having a quantity equal to the splicing quantity, to obtain the bullet-screen comment picture comprises:

arranging, in the gift picture arrangement sequence, the gift pictures having a quantity equal to the splicing quantity; and splicing the arranged gift pictures into the bullet-screen comment picture.

15. The computing device according to claim 10, wherein the one or more programs further comprises instructions for: before the receiving the virtual gift information, obtaining the gift picture material library from a server at a preset moment, wherein the gift picture material library is a set of gift pictures preset for a preset virtual gift; and locally storing the gift picture material library.

16. The computing device according to claim 10, wherein the one or more programs further comprises instructions for: before the receiving the virtual gift information, selecting the target virtual gift from a gift backpack of a live room in a livestreaming process; and sending a gift giving request to a server based on the target virtual gift; and correspondingly, the receiving the virtual gift information comprises:

receiving virtual gift information broadcasted by the server based on the gift giving request.

17. The computing device according to claim 10, wherein the virtual gift information comprises a user identifier; and the splicing the at least two obtained gift pictures based on the giving quantity of target virtual gifts and the preset splicing rule, to obtain the bullet-screen comment picture comprises:

splicing the at least two obtained gift pictures and the user identifier based on the giving quantity of target virtual gifts and the preset splicing rule, to obtain the bullet-screen comment picture.

18. The computing device according to claim 10, wherein the displaying the bullet-screen comment picture in the bullet-screen comment area comprises:

performing picture processing on the bullet-screen comment picture, to obtain a display picture with a bullet-screen comment size; and displaying the display picture with the bullet-screen comment size in the bullet-screen comment area.

19. A non-transitory computer-readable storage medium, wherein the non-transitory computer-readable storage medium stores one or more programs comprising instructions that, when executed by one or more processors of a computing device, cause the computing device to perform operations comprising:

receiving virtual gift information, wherein the virtual gift information comprises a given target virtual gift and a giving quantity of target virtual gifts;

obtaining at least two gift pictures corresponding to the target virtual gift from a gift picture material library;

splicing the at least two obtained gift pictures based on the giving quantity of target virtual gifts and a preset splicing rule, to obtain a bullet-screen comment picture; and displaying the bullet-screen comment picture in a bullet-screen comment area.

20. The non-transitory computer-readable storage medium according to claim 19, wherein instructions, when executed by the one or more processors of the computing device, further cause the computing device to perform operations comprising: before the obtaining the at least two gift pictures corresponding to the target virtual gift from the gift picture material library, parsing the virtual gift information, to obtain a gift identifier of the target virtual gift in the virtual gift information; and in response to determining that the gift identifier is a preset gift identifier, performing the operation step of obtaining the at least two gift pictures corresponding to the target virtual gift from the gift picture material library.

\* \* \* \* \*